Oct. 17, 1961  R. L. ATKIN  3,004,796
WHEEL AND BRAKE DRUM ASSEMBLY
Filed Jan. 12, 1959  3 Sheets-Sheet 1

INVENTOR.
RUPERT L. ATKIN
BY
Whittemore, Hulbert & Belknap
ATTORNEYS

Oct. 17, 1961 R. L. ATKIN 3,004,796
WHEEL AND BRAKE DRUM ASSEMBLY
Filed Jan. 12, 1959 3 Sheets-Sheet 2

INVENTOR.
RUPERT L. ATKIN
BY
Whittemore, Hulbert & Belknap
ATTORNEYS

INVENTOR.
RUPERT L. ATKIN

United States Patent Office 3,004,796
Patented Oct. 17, 1961

3,004,796
WHEEL AND BRAKE DRUM ASSEMBLY
Rupert L. Atkin, Grosse Pointe Woods, Mich., assignor to Kelsey-Hayes Company, Detroit, Mich., a corporation of Delaware
Filed Jan. 12, 1959, Ser. No. 786,243
7 Claims. (Cl. 301—6)

This invention relates to wheel and brake drum assemblies and refers more particularly to a mounting for a wheel and brake drum assembly.

The invention has for one of its objects to provide a mounting for a wheel and brake drum assembly which facilitates mounting and demounting.

The invention has for another object to provide a wheel and brake drum assembly in which the web of the drum is exposed on the outboard side to present a wheel body appearance and, either alone or in cooperation with a hub cap, conceals a mounting plate for the assembly secured to the drum.

Other objects and features of the invention will become apparent as the description proceeds, especially when taken in conjunction with the accompanying drawings, illustrating preferred embodiments of the invention, wherein.

Figure 1:
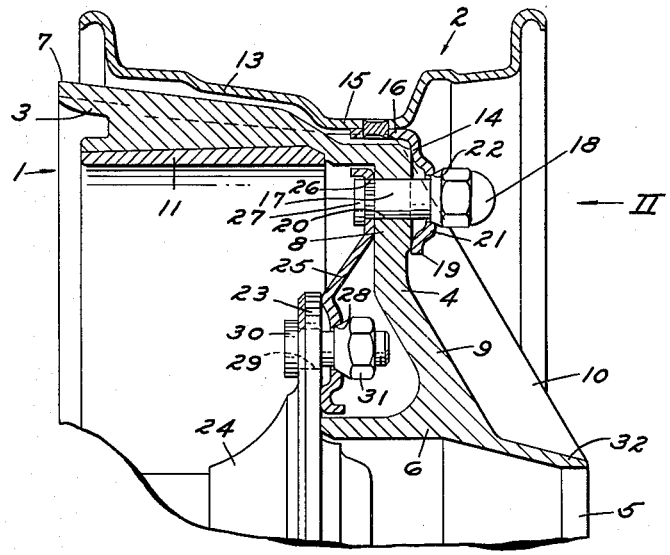
FIG. 1 is a radial section of a wheel and brake drum assembly embodying the invention.
Figure 2:
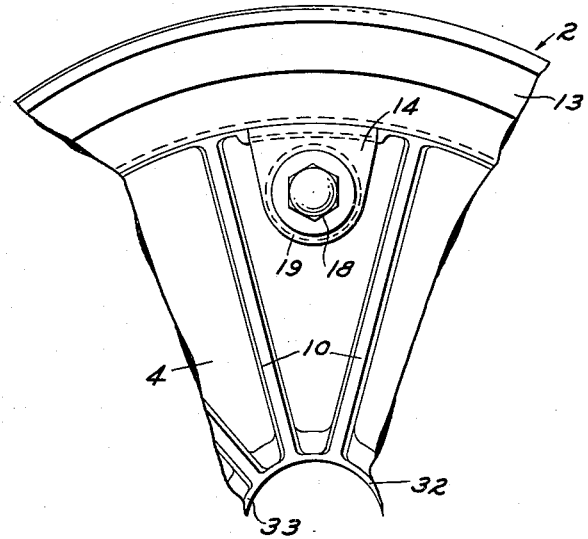
FIG. 2 is a fragmentary side elevation, looking in the direction of the arrow II of FIG. 1.

Referring to FIGS. 1 and 2, 1 is the brake drum and 2 is the wheel structure. The brake drum is a cast element in the form of a shell having the integral annular flange 3 and web 4. The web has a central opening 5 formed by the inner circular hub-like portion 6. The shell is cast integrally of aluminum or magnesium, which are relatively light in weight and have high heat transfer characteristics. However, other materials may be employed.

The annular flange 3 is formed with a series of circumferentially spaced heat dissipating ribs 7 cast integrally with the flange. The web 4 has an annular radial portion 8 connecting into the flange, and an annular portion 9 which is inclined radially inwardly from the radial portion in an outboard direction and connects into the portion 6. Heat dissipating ribs 10 are provided on the outboard side of the web and are cast integrally therewith, extending radially in equally spaced relation about the axis of the drum.

11 is a cast-iron liner bonded to the inner surface of flange 3 for engagement by a suitable friction device, not shown. The brake drum shell may be formed by casting in a sand or permanent mold or by die casting, for example. Preferably the liner 11 is placed in the mold prior to casting and the brake drum shell is cast around the liner. During casting of the shell, a molecular bond is obtained between the liner and shell on all contacting surfaces. The particular process for casting an aluminum drum around a cast iron liner is described more fully in my co-pending application, Serial No. 736,053, filed May 19, 1958.

The wheel structure 2 comprises an annular tire rim 13 and mounting tabs 14. The rim encircles the brake drum and is formed with a well 15. The tabs 14 are disposed circumferentially with respect to the rim in equally spaced relation and are formed with generally axially extending seat portions 16 secured to the bottom of the well by any suitable means such as welding. The number of tabs may vary but in the present instance a tab is provided in each alternate space between the ribs 10.

By means of the tabs 14, the rim is detachably secured to the brake drum with bolts 17 and nuts 18. Each tab has a radial portion 19 depending from the axially extending portion thereof which overlies a hole 20 in the web of the drum near its flange, and each radial portion 19 has a raised central part 21 formed with a hole 22 registering with a hole 20 in the web. Bolts 17 extend freely through the registering holes 20 and 22 and nuts 18 are threaded on the outer ends of the bolts and bear against the raised parts 21 of the tabs to draw the tabs firmly against the outboard side of the web.

The wheel and brake drum assembly is mounted on a rotatable member, in the present instance on the flange 23 of a rear axle 24, by an annular mounting plate 25 having the cross-section illustrated. The radial outer portion of the plate is formed with a series of holes 26 spaced apart uniformly in accordance with the circumferential spacing of the holes 20 in the web. The mounting plate is on the inboard side of the web and preferably the shank of each bolt is permanently secured to the plate by staking. The head 27 of each bolt bears against the mounting plate to clamp it tightly against the web in the assembled relation of the parts.

The mounting plate has near its inner margin a circular series of equally spaced openings 28 adapted to register with openings 29 in the axle flange, and bolts 30 and nuts 31 are provided for detachably securing the mounting plate to the axle flange through the registering holes 28 and 29.

The hub-like portion 6 of the web includes an axially outwardly projecting formation 32 adapted to detachably retain a hub cap, not shown.

In order to assemble the wheel and brake drum assembly on the axle flange, the mounting plate 25 with the bolts 17 permanently staked in the openings 26 thereof is detachably secured to the axle flange by the bolts 30 and nuts 31. The drum is then positioned to register the holes 20 thereof with the shanks of bolts 17 and is slipped over the latter. Thereafter the rim is fitted over the drum with the tab holes 22 in register with and receiving the bolt shanks, and the nuts 18 are threaded on the bolts to complete the assembly. A hub cap may be snapped on or otherwise detachably connected to the portion 32 of the drum. The web of the drum completely conceals the mounting plate when the assembly is viewed from the outboard side, and the wheel structure and drum are detachably connected to the mounting plate by the series of bolts 17 and nuts 18. The web of the drum is exposed on the outboard side and presents a wheel body appearance.

Figure 3:
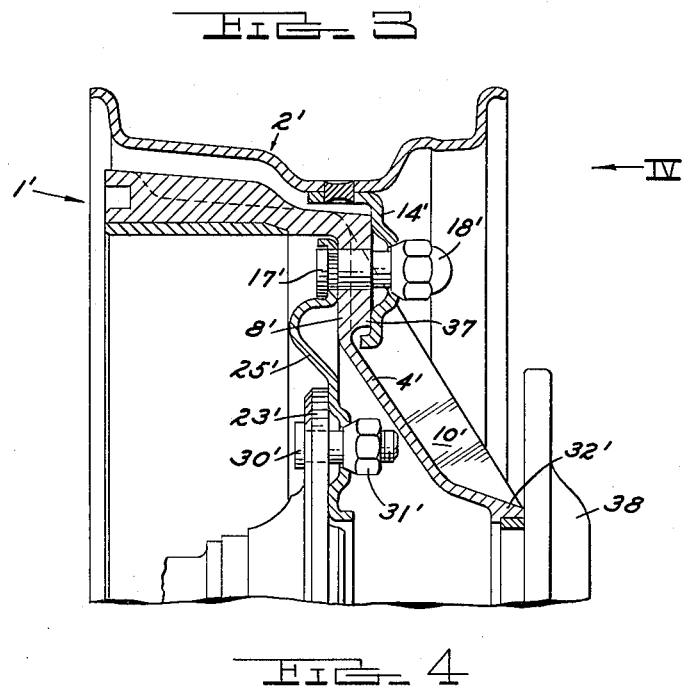
FIG. 3 is a view similar to FIG. 1 showing a modified construction.
Figure 4:
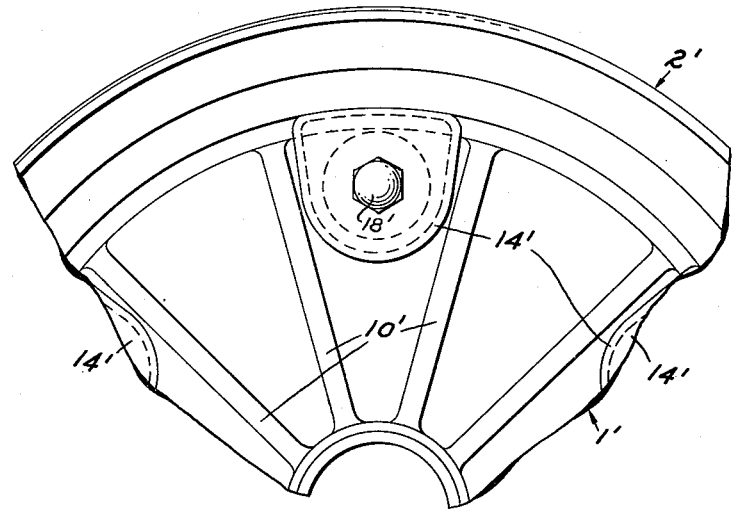
FIG. 4 is a fragmentary side elevation, looking in the direction of the arrow IV of FIG. 3, with the hub cap removed.

FIGS. 3 and 4 illustrate a modification which is very similar to that shown in FIGS. 1 and 2 and in which corresponding parts are designated by the same numbers primed. The brake drum shell 1' may be of the same material as the shell in FIGS. 1 and 2. It will be noted that the web 4' thereof is of the same general shape as the one previously described but of a thinner section, and the radial portion 8' is formed with enlargements or bosses 37 between the ribs 10' for supporting the mounting tabs 14'. A hub cap 38 is shown detachably secured to the hub cap retaining formation 32' of the brake drum. The mounting plate 25' is like the one first described although it has a somewhat different cross-section as illustrated. The bolts 17' are staked in the mounting plate holes and the mounting plate is detachably secured to the axle flange 23' by bolts 30' and nuts 31'. The bolts 17' extend freely through registering holes in the drum web and in the rim tabs, and in cooperation with nuts 18' detachably mount the wheel structure 2' and drum 1'. The web of the drum conceals the mounting plate when the assembly is viewed from the outboard side and is exposed on the outboard side to present a wheel body appearance.

Figure 5:
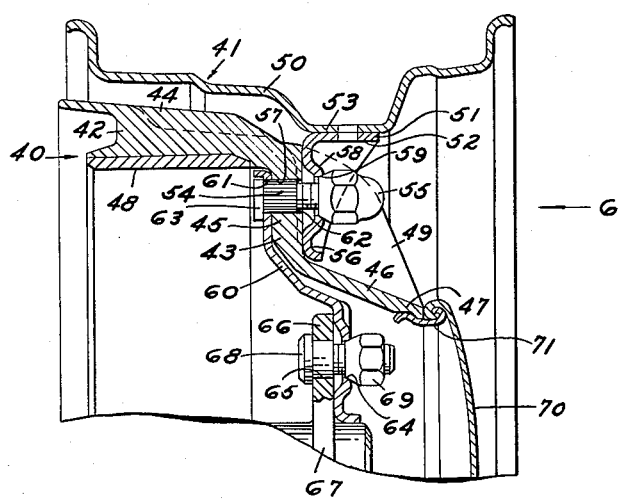
FIG. 5 is a view similar to FIGS. 1 and 3 showing another modified construction.
Figure 6:
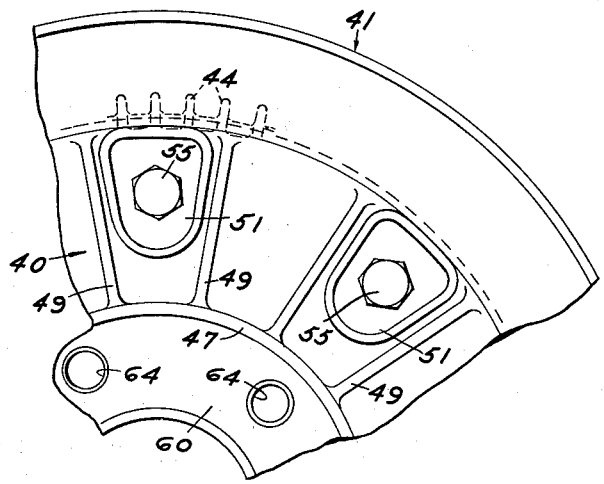
FIG. 6 is a fragmentary side elevation, looking in the direction of the arrow VI of FIG. 5, with the hub cap removed.

FIGS. 5 and 6 illustrate another modification in which the brake drum is indicated at 40 and the wheel structure at 41. The brake drum is a cast element in the form of a shell having the integral annular flange 42 and web 43. The shell is preferably cast of aluminum or magnesium, but other materials may be employed. The flange 42 is formed with the circumferentially spaced heat dissipating ribs 44 cast integrally with the flange. The web 43 has the radial portion 45 connecting into the flange and the portion 46 connecting into the radial portion and inclined therefrom axially outwardly and radially inwardly to terminate in a circular hub cap retaining formation 47 which defines a circular central opening in the web. The liner 48 is of cast iron and bonded to the flange as in the embodiment first described. Heat dissipating ribs 49 are cast integrally with the web of the drum on the outboard side thereof and extend radially in equally spaced relation.

The wheel structure 41 comprises the annular tire rim 50 and mounting tabs 51. The tabs are disposed circumferentially with respect to the rim in equally spaced relation and have the axially extending portions 52 secured to the bottom wall of the well 53 of the rim. The number of tabs may vary, but in the present instance tabs are provided in each alternate space between the ribs 49. By means of the tabs 51, the rim is detachably secured to the brake drum by bolts 54 and nuts 55. Each tab has a radial portion 56 depending from the axially extending portion which overlies a hole 57 in the web of the drum near its flange, and each radial portion has a raised central part 58 formed with a hole 59 registering with the hole 57 in the web. The bolt shanks extend through the registering holes 57 and 59 and the nuts 55 are threaded on the outer ends of the bolts and bear against the raised parts 58 of the tabs to draw the tabs firmly against the outboard side of the web.

The annular mounting plate 60 is formed with a circular series of equally spaced holes 61 adapted to register with the holes 57 in the brake drum web. The bolts 54 extend through the registering holes 57 and 61 and are staked at 62 to permanently clamp the drum and mounting plate together against the heads 63 of the bolts. The mounting plate is formed with a second circular series of equally spaced holes 64 near its inner margin adapted to register with the holes 65 of a circular series formed in the flange 66 of the axle 67. The mounting plate is detachably secured to the axle flange by the bolts 68 extending through the registering holes 64 and 65 and the nuts 69 threaded on the outer ends of the bolts.

The mounting plate extends radially inwardly beyond the inner margin of the web defined by the hub cap retaining formation 47 thereof for easy access to mount and demount the drum and mounting plate. A hub cap 70 detachably secured in position on the web and retained across the central opening thereof by the clips 71 engaging the formation 47 conceals the otherwise exposed portion of the mounting plate, and the remainder of the plate is concealed by the web. The web is exposed on the outboard side and presents a wheel body appearance.

Prior to assembly, the bolts 54 are inserted in the registering holes 57 and 61 of the drum and mounting plate and staked at 62 to form a permanent assembly. The mounting plate and drum are then detachably secured to the axle flange by the bolts 68 and nuts 69. Thereafter the rim is placed over the drum with the tab holes 59 in register with and receiving the shanks of bolts 54 and the nuts 55 are applied to detachably secure the wheel structure to the drum.

While in each of the embodiments illustrated above the wheel and brake drum assembly is shown mounted by the mounting plate on a rear axle, it will be understood that the assembly may be mounted by the plate or equivalent structure on any rotatable member such as the standard hub on a front spindle, for example.

As pointed out above, the drum shells in the three embodiments are preferably formed of aluminum or magnesium because of their high heat transfer characteristics. The web of the drum is in each case exposed on the outboard side, as are the ribs integral therewith, for maximum cooling effect. The exposed web gives the appearance of a full aluminum wheel, where aluminum is used. Preferably the mounting plate in each instance is in the form of a steel stamping.

What I claim as my invention is:

1. In a wheel and brake drum assembly, a brake drum having a web and an annular flange, a wheel structure, means detachably mounting said wheel structure on said drum near said flange, an annular mounting plate serving as a wheel body detachably secured along its radially outer margin to said drum at the inboard side of said web by said mounting means, a rotatable member, means detachably securing the radially inner margin of said plate to said rotatable member, said web being free of direct connection with said rotatable member and overlying and completely concealing said plate when the assembly is viewed from the outboard side and said web being exposed on the outboard side of the assembly for maximum cooling and simulating a wheel body in appearance.

2. In a wheel and brake drum assembly, a brake drum of a high heat conductivity material having an integral web and an annular flange at the radially outer periphery of said web, a wheel structure comprising an annular rim encircling said drum and circumferentially spaced mounting tabs secured to said rim, fasteners detachably mounting said tabs on said web near said flange, an annular mounting plate serving as a wheel body detachably secured along its radially outer margin to said drum by said fasteners at the inboard side of said web, a rotatable member, means detachably securing the radially inner margin of said mounting plate to said rotatable member, said web being free of direct connection with said rotatable member and overlying and completely concealing said plate when said assembly is viewed from the outboard side, said web having an axially outward annular hub cap retaining formation on the outboard side, and said web radially outwardly of said formation being exposed on the outboard side for maximum cooling and simulating a wheel body in appearance.

3. In a wheel and brake drum assembly a brake drum having an annular web and an annular flange, a wheel structure, means detachably mounting said wheel structure on said drum, a mounting plate serving as a wheel body secured to said drum at the inboard side of said web, said mounting plate having a portion radially inwardly beyond the radially inner margin of said annular web and accessible from the outboard side through the opening defined by said radially inner margin for detachably mounting said plate on a rotatable member, said web having means for retaining a hub cap over the opening in said web, and said web being exposed on the outboard side for maximum cooling effect and simulating a wheel body in appearance.

4. In a wheel and brake drum assembly, a brake drum having an annular web and an annular flange, a wheel structure, means detachably mounting said wheel structure on said drum, a mounting plate serving as a wheel body permanently secured to said drum at the inboard side of said web by at least a portion of said means, said mounting plate having a portion radially inwardly beyond the radially inner margin of said annular web and accessible from the outboard side through the opening defined by said radially inner margin for detachably mounting said plate on a rotatable member, said web having means for retaining a hub cap over the opening in said web adapted to cooperate with said web in concealing said plate when the assembly is viewed from the outboard side, said web being exposed on the outboard side for maximum cooling effect and to present a wheel body appearance.

5. In a wheel and brake drum assembly, a brake drum of high heat conductivity material having an integral annular web and an annular flange at the radially outer periphery of said web, a wheel structure comprising an annular rim encircling said drum and circumferentially spaced mounting tabs secured to said rim, fasteners detachably mounting said tabs on said web near said flange, an annular mounting plate serving as a wheel body permanently secured to said web on the inboard side thereof by said fasteners, said mounting plate having a portion radially inwardly beyond the radially inner margin of said annular web and accessible from the outboard side through the opening defined by said radially inner margin for detachably mounting said plate on a rotatable member, said web having an axially outwardly extending annular hub cap retaining formation on the outboard side to mount a hub cap adapted to cooperate with said web in concealing said mounting plate when said assembly is viewed from the outboard side, said web being exposed on the outboard side for maximum cooling effect and simulating a wheel body in appearance.

6. In a wheel and brake drum assembly a brake drum having an annular web and an annular flange, a wheel structure, means detachably mounting said wheel structure on said drum, a mounting plate serving as a wheel body secured to said drum at the inboard side of said web, said mounting plate having a portion radially inwardly beyond the radially inner margin of said annular web and accessible from the outboard side through the opening defined by said radially inner margin for detachably mounting said plate on a rotatable member.

7. In a wheel and brake drum assembly, a brake drum having a web and an annular flange, a wheel structure, means detachably mounting said wheel structure on said drum near said flange, a mounting plate serving as a wheel body detachably secured to said drum at the inboard side of said web, a rotatable member, means detachably securing said plate to said rotatable member, said web being free of direct connection with said rotatable member and overlying and completely concealing said plate when the assembly is viewed from the outboard side and said web being exposed on the outboard side of the assembly for maximum cooling and simulating a wheel body in appearance.

References Cited in the file of this patent
UNITED STATES PATENTS

| | | |
|---|---|---|
| 1,406,759 | Putnam | Feb. 14, 1922 |
| 1,439,269 | Siddeley | Dec. 19, 1922 |
| 2,133,597 | Tjaarda | Oct. 18, 1938 |
| 2,150,111 | Tatter | Mar. 7, 1939 |
| 2,687,192 | Butterfield | Aug. 24, 1954 |